United States Patent [19]

Strawcynski et al.

[11] Patent Number: 5,239,682

[45] Date of Patent: Aug. 24, 1993

[54] INTER-CELL CALL HAND-OVER IN RADIO COMMUNICATION SYSTEMS WITH DYNAMIC CHANNEL ALLOCATION

[75] Inventors: Leo Strawcynski; Howard M. Sandler, both of Ottawa; Gregory L. Plett, North Gower; David G. Steer, Nepean, all of Canada

[73] Assignee: Northern Telecom Limited, Montreal, Canada

[21] Appl. No.: 710,867

[22] Filed: Jun. 6, 1991

[30] Foreign Application Priority Data

Dec. 5, 1990 [CA] Canada ................... 2031551

[51] Int. Cl.$^5$ .................... A04B 7/00; H04B 17/00
[52] U.S. Cl. .................... 455/54.1; 455/56.1; 455/62; 379/59
[58] Field of Search .......... 455/33.1, 33.2, 33.4, 455/54.1, 54.2, 56.1, 62; 379/58, 59, 60

[56] References Cited

U.S. PATENT DOCUMENTS

| | | | |
|---|---|---|---|
| 4,475,010 | 10/1984 | Huensch et al. | 455/56.1 |
| 5,038,399 | 8/1991 | Bruckert | 455/62 |
| 5,093,926 | 3/1992 | Sasufa | 455/62 |

Primary Examiner—Reinhard J. Eisenzopf
Assistant Examiner—Lisa Charouel
Attorney, Agent, or Firm—Jean-Pierre Fortin

[57] ABSTRACT

The call hand-over technique of this invention is characterized by the use of channel information from both the target base station and subscriber terminal in determining which radio traffic channel will be used to hand over a call in progress from a serving base station to a target base station. Calls are handed over to the radio channel which, of a set of channels under consideration by the subscriber terminal, contains the least amount of interference as measured by the subscriber terminal. The set of channels under consideration by the subscriber terminal is a subset of the entire set of channels allocated to the service. This subset is comprised of those channels having little interference, as measured by the target base station. The hand-over technique thereby assures that calls proceed on channels containing little interference from the viewpoints of both the target base station and subscriber terminal.

7 Claims, 6 Drawing Sheets

INTER-CELL CALL HAND-OVER IN RADIO COMMUNICATION SYSTEMS WITH DYNAMIC CHANNEL ALLOCATION

FIELD OF THE INVENTION

This invention relates to radio communication systems which use dynamic channel allocation, especially, but not restricted to, cellular radio systems.

DESCRIPTION OF THE PRIOR ART

A duplex radio link conveying user analogue and/or digital information shall henceforth be referred to as a "call". An example is a telephone call over a wireless channel.

Cellular radio communication systems are able to service a high volume of traffic with a limited amount of radio spectrum by re-using the same radio channels in sufficiently separated cells. In conventional city-wide mobile cellular systems, such as the North American Advanced Mobile Phone System, the frequency allocations for a specific cell are fixed; i.e., each cell can make use of only a specified subset of channels of those allocated to the entire service. The allocations of channels require careful engineering analyses of radio propagation conditions and traffic patterns within and between the cells. Fixed allocation cellular radio systems are engineered so that harmful levels of interference from signals used in neighbouring cells are unlikely to be encountered.

When the communication link is changed without changing the base station that communicates with the subscriber, it is known as an "intra-cell" hand-over, i.e., within a cell. A description of an intra-cell handover is disclosed in a co-pending application entitled "Improved Intra-cell Call Handover in Radio Communication Systems with Dynamic Channel Allocation" filed on Jun. 6, 1991 and having Ser. No. 07/710,866. On the other hand, when a subscriber terminal moves out of the coverage area of one base station and into that of another, the call may be maintained by switching the communication link to the closer base station. This is known as an "inter-cell" hand-over, i.e., between cells.

Micro-cellular radio systems tend to use dynamic, rather than fixed, channel allocation. With dynamic channel allocation (DCA) each cell can potentially use any traffic channel for a given call of those allocated to the entire service. The decision as to which channel to use is made dynamically. i.e. based on channel usage conditions experienced at the time of call set-up. The decision is also made in a decentralized manner, i.e. by the base station or subscriber terminal in question, without any centralized coordination with other cells. This has the advantages that no detailed engineering analyses are required for each cell site, cell sites can easily be added or moved, and more traffic can be handled than with fixed allocation, because channels unused in neighbouring cells can be "borrowed". Examples of radio systems which use DCA are the digital U.K. CT2 system, and some models of analogue North American 46/49 MHz cordless telephones.

A disadvantage of DCA, however, is that interference may suddenly arise in an existing call if another call is set up on the same or an adjacent channel in a nearby cell. Without fixed channel assignments, freedom from interference is not assured. To escape from interference, an existing call may need to be handed over to a radio channel which is free from interference.

As indicated above, when this is done without changing the base station that communicates with the subscriber, it is known as an "intra-cell" hand-over, i.e., within a cell.

When either an intra- or inter-cell hand-over is performed in a DCA system, a suitable radio channel must be selected to continue the call. In present systems incorporating DCA, the determination of which channel is used for a call set-up or hand-over is made according to channel information from the base station or the subscriber terminal. The disadvantage with this approach is that appreciable interference may be present on the selected channel from the viewpoint of the other end of the link. For example, a traffic channel may have little appreciable interference, as monitored by the serving base station. However, the same traffic channel may have unacceptable interference at the subscriber terminal or at the target base station if a inter-cell handover is attempted. Therefore, the presence of interference may reduce the quality of the link and also make it more susceptible to any further channel impairments which might arise.

Accordingly, it is an object of the present invention to provide an improved method of performing inter-cell hand-over in radio systems with DCA, characterized by the use of channel information from both the target base station and subscriber terminal in determining which traffic channel to use.

SUMMARY OF THE INVENTION

The hand-over procedures of this invention require that there be a means of communicating call supervisory information between a base station and a subscriber terminal. A suitable means is an in-band signalling channel associated with each traffic channel. When a subscriber moves away from a serving cell towards or into an adjacent cell, or moves within range of another base station, an inter-cell handover maybe necessary. In advance of an inter-cell hand-over, the target, i.e., prospective new base station, compiles a list of candidate traffic channels which have low interference from its perspective (and are not otherwise undesirable due to additional information known to the base station). This list is passed via a wired link to the original base station. The original base station conveys the information over the inband or associated signalling channel to the subscriber terminal. The subscriber terminal checks these candidates, chooses the traffic channel which has the lowest interference from its perspective, and reports this choice to the original base station over the associated signalling channel. The original base station conveys this information to the target base station via the wired link. If an inter-cell hand-over becomes necessary, the call proceeds on the agreed-upon traffic channel to the target base station.

Accordingly, an aspect of the present invention is to provide a method of performing a radio channel hand-over in a radio system with dynamic channel allocation, from a serving base station in communication with a subscriber terminal to a target base station, comprising the steps of:

selecting, from a plurality of traffic channels, a number of suitable traffic channels, as measured at the target base station;

forwarding, from the target base station to the serving base station, a message indicative of which traffic channels were determined suitable at the target base station;

sending the message to the subscriber terminal along a signalling channel linking the serving base station and the subscriber terminal;

receiving the message at the subscriber terminal;

selecting, from the traffic channels indicated by the message, a traffic channel that is also suitable at the subscriber terminal;

forwarding, to the serving base station, a response message indicative of a selected traffic channel;

sending the response message to the target base station; and switching to the selected radio channel at the subscriber terminal and the target base station.

DESCRIPTION OF THE PREFERRED EMBODIMENT

Figure 1:
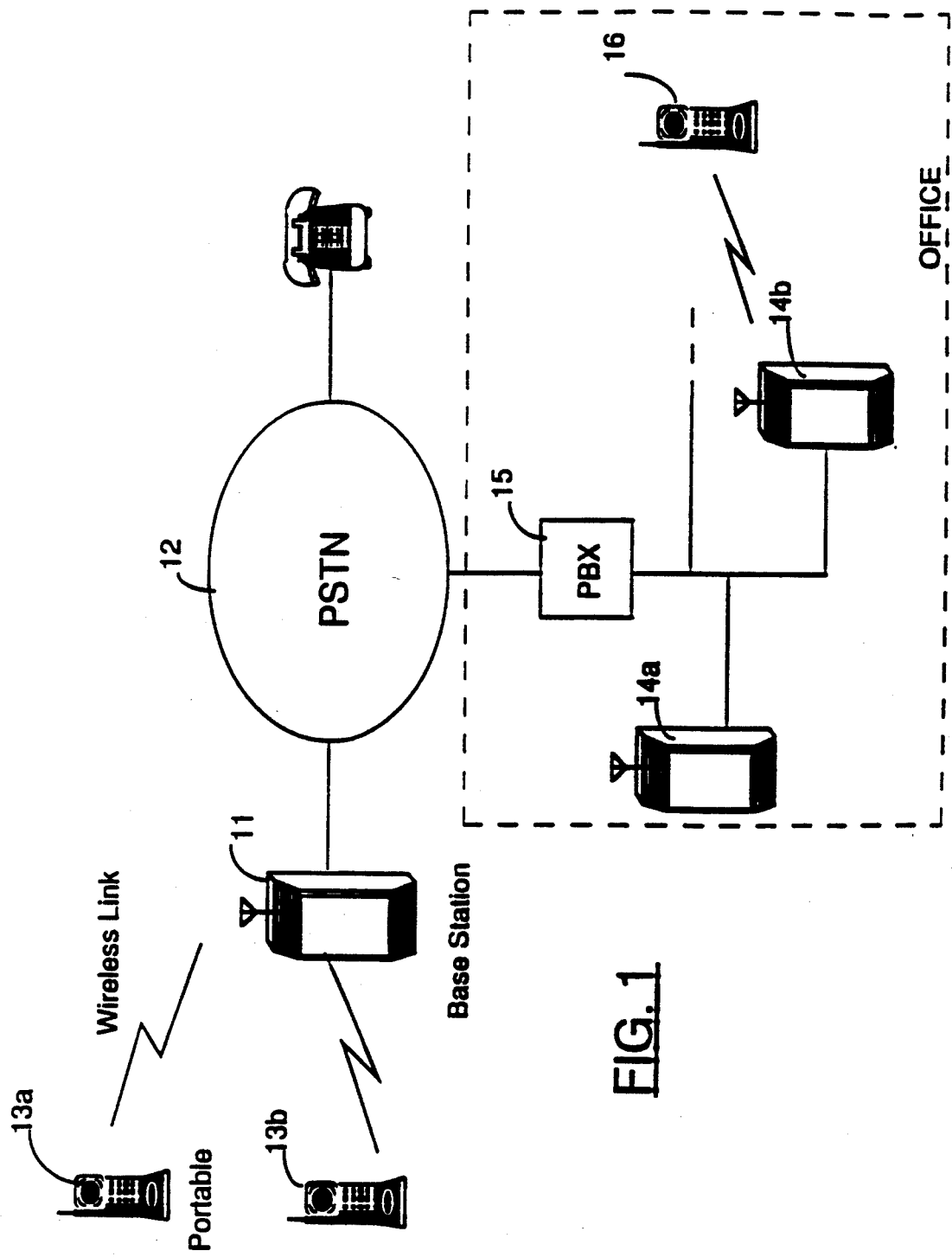
FIG. 1 is an illustration of a typical low power radio system embodying the invention.

In the illustration of FIG. 1, a low-power wireless communication system is shown. A typical network can consist of one or more small base stations, such as shown at reference numeral 11. In FIG. 1, base station 11 is connected to the Public Switched Telephone Network (PSTN) 12. Base stations are basically used as radio transceivers. These can be deployed in offices, residences, and public areas, such as airports, gas stations and shopping malls, etc. Base stations form the interface between a number of subscriber terminals such as portable handsets 13a and 13b and PSTN 12. Similarly, several base stations, such as those shown at reference numerals 14a and 14b can also be linked to a host, such as a private branch exchange PBX 15 to provide coverage of larger areas, in say, a private business or office building. A subscriber terminal 16 could therefore operate in an office building via base station 14a or 14b and outside thereof, via base station 11. Such a wireless PBX system is disclosed in U.S. Pat. No. 4,771,448.

Figure 2:
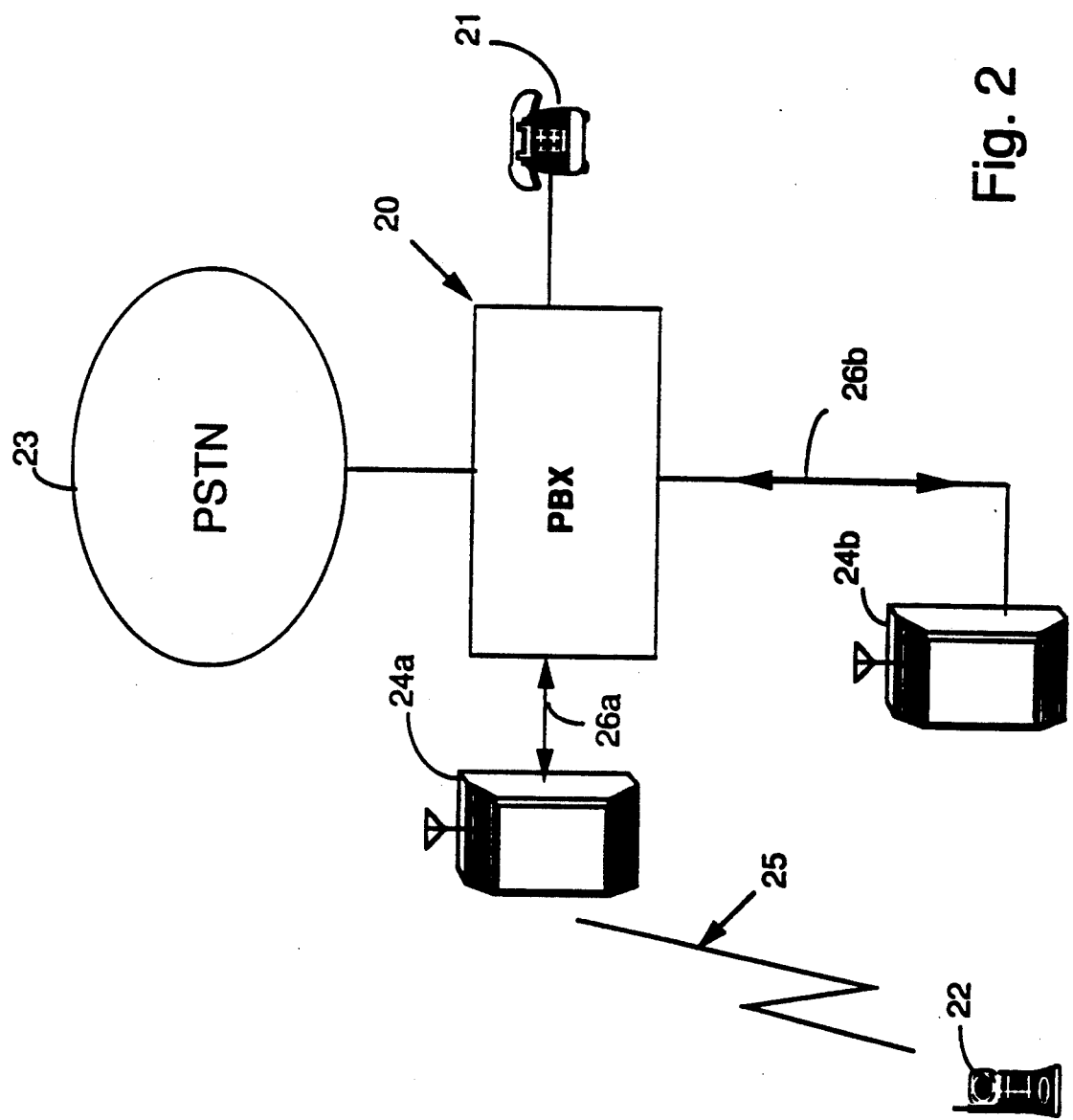
FIG. 2 illustrates how a call hand over can be implemented in a low power radio system such as shown in FIG. 1.

Referring now to FIG. 2, we have shown a low power wireless communication system which can be installed in a private business or office building. A PBX 20 is used by POTS (Plain Old Telephone Service) 21 and a wireless subscriber terminal 22 to establish call connections to PSTN 23. Base stations 24a and 24b can be placed at various locations in the office building to allow the use of a wireless subscriber terminal 22 where required. In the illustration, subscriber terminal 22 is being served by base station 24a. In the event that interference arises on the communication channel linking the base station and the subscriber terminal, an intracell handover may be necessary. That is, another channel without interference would be selected. A description of an intra-cell handover is disclosed in a co-pending application entitled "Improved Intra-cell Call Hand-over in Radio Communication Systems with Dynamic Channel Allocation". In the event that the subscriber terminal moves to an area which is better served by base station 24b, the call is handed over from the serving base station 24a to the target base station 24b.

Figure 4A:
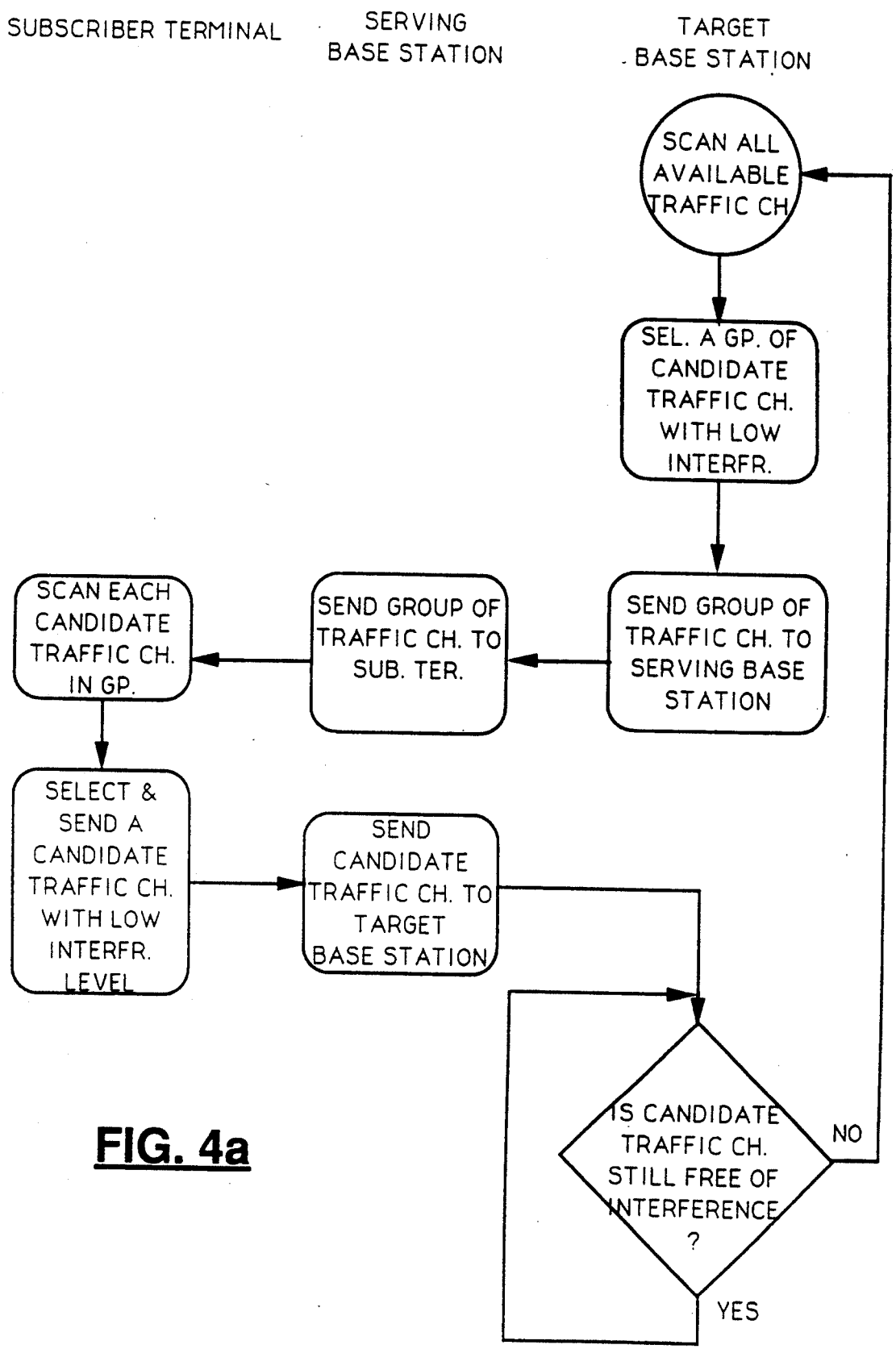
FIGS. 4a to 4c are flow diagrams illustrating the inter-cell hand-over technique of the present invention.

Referring now to FIGS. 2 and 4a, the base station 24b, which has been selected to be the target base station, would scan all available traffic channels, and select traffic channels that are useable or free of interference at the base station's end of the link. It is to be noted that the base stations could also be configured such that all traffic channels are prescanned. That is, the base stations could scan the traffic channels continuously or on a regular interval and thereby maintain a list of useable traffic channels. A list of frequencies or traffic channels is made and forwarded to serving base station 24a via an inter base station link or trunk 26a and 26b linking the serving base station 24a, the target base station 24b and PBX 20. In the preferred embodiment, only a certain number of traffic channels would be selected as useable. For example, the base station could be configured to select the first 3 traffic channels with interference levels below a threshold. Similarly, the base station could also be configured to select the 3 traffic channels which have the lowest interference levels. If there are no sufficient traffic channels with interference below the threshold, then, additional channels with interference levels above the threshold may be selected as well. The traffic channels selected would be those that have the lowest interference levels even though the levels are above the threshold. It will of course be understood that if some of the latter traffic channels are considered to offer inadequate communication between the base station and the subscriber terminal, they would be excluded from the selection. The serving base station 24a then forwards the list of traffic channels to the subscriber terminal 22 via the inband or associated signalling channel. Once received, the list of useable frequencies or traffic channels, is scanned by subscriber terminal 22. The subscriber terminal can then select frequencies or traffic channels of those indicated in the list which are also free of interference at the subscriber end of the link. In the preferred embodiment, the traffic channel determined to contain the least interference level of those scanned is selected by the subscriber terminal.

Figure 4B:
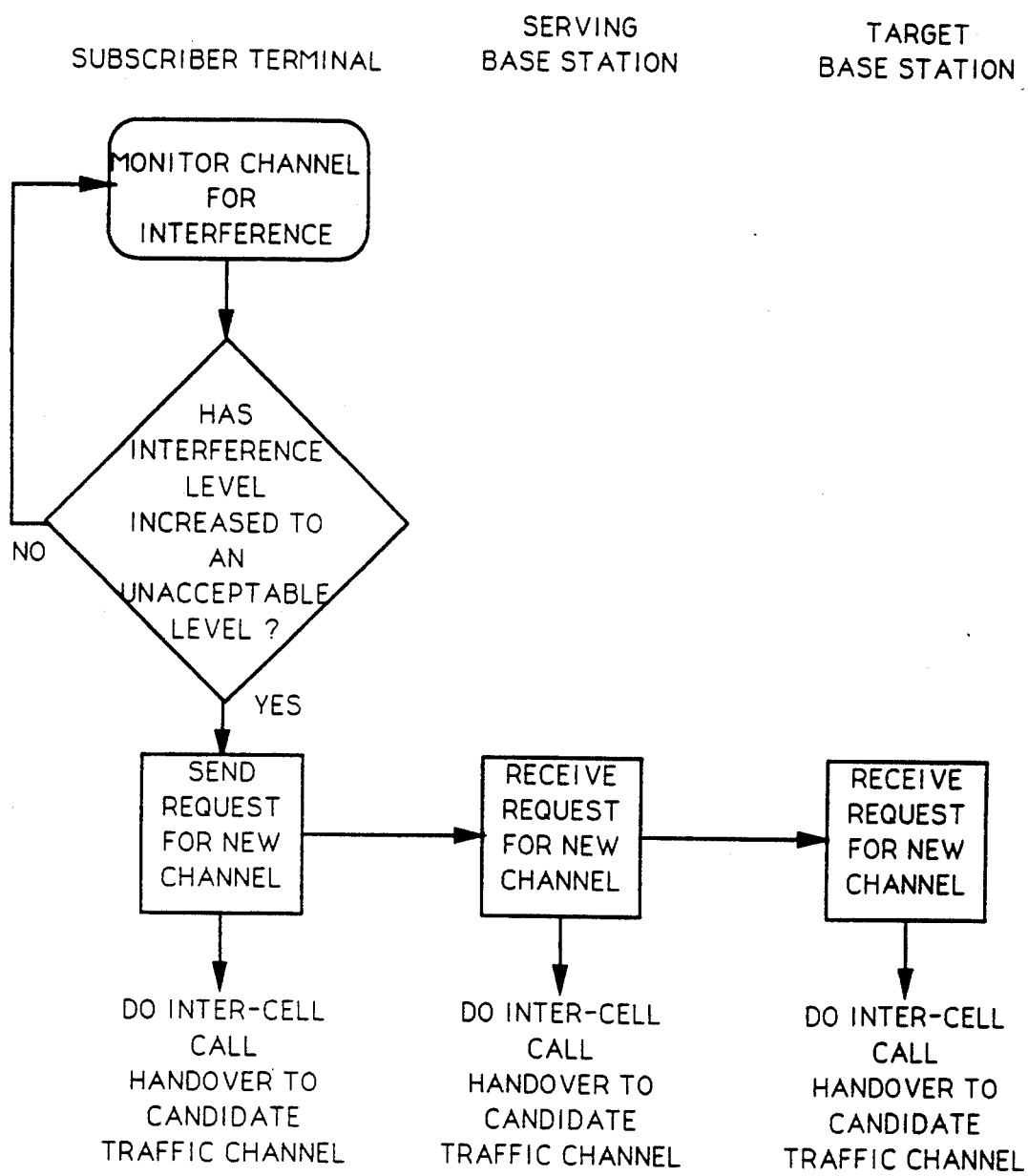
Figure 4C:
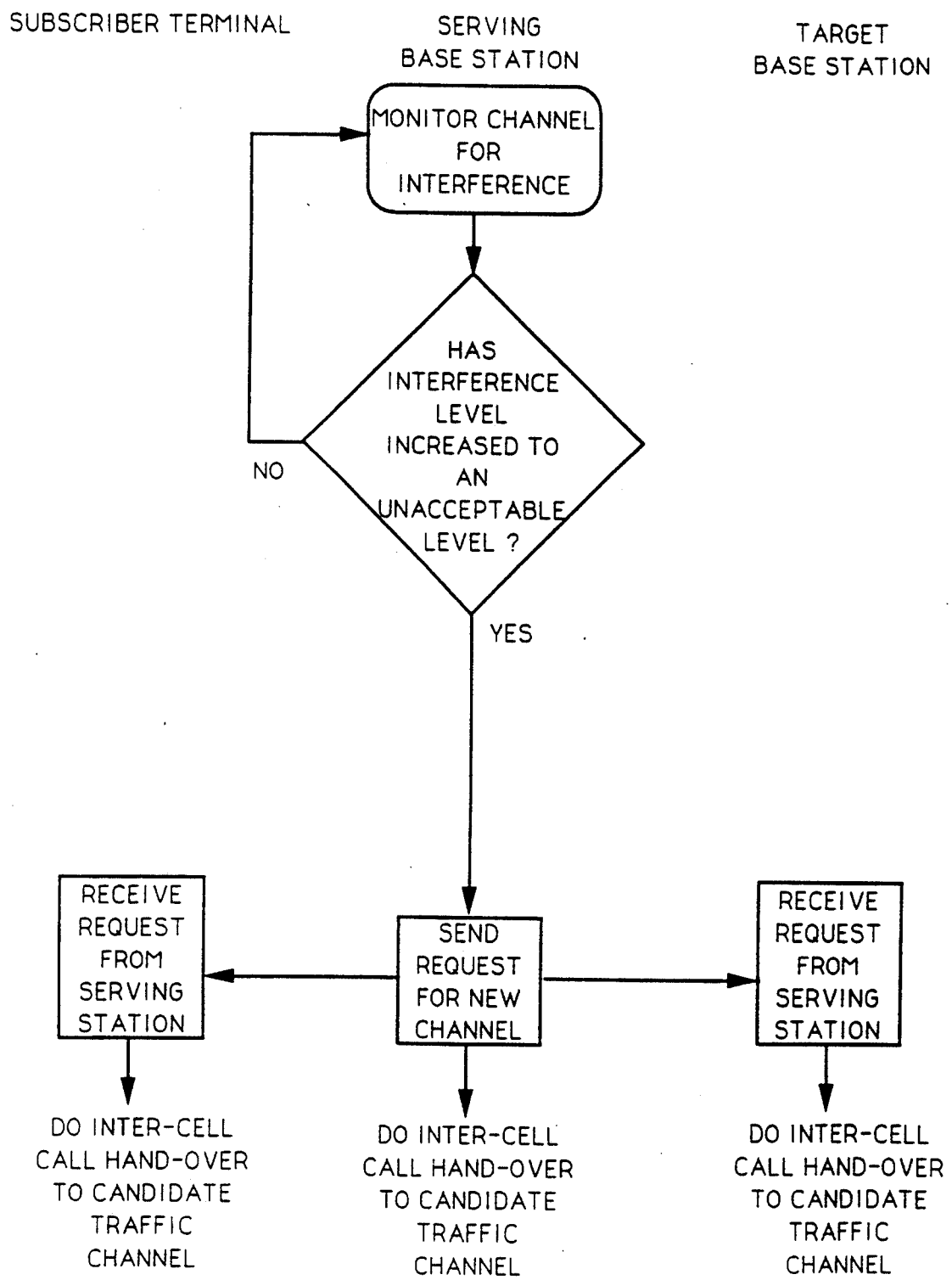

Once the traffic channel containing the least interference is selected, the subscriber terminal sends a message to the serving base station 24a on the inband or associated signalling channel providing an indication of which traffic channel was selected. The serving base station then forwards the selection to the target base station 24b. As shown in FIGS. 4b and 4c, if an inter-cell hand-over becomes necessary, the subscriber terminal 22 and the target base station 24b are switched over to the selected channel and the call continues. If none of the traffic channels in the list were determined to be adequate, a message can be sent to the base station indicating that the call hand-over between the subscriber terminal and the target base station cannot proceed.

The hand-over can then be initiated, by instructing both the target base station and the subscriber terminal to switch to the selected channel. The serving base station would then release the channel once the hand-over is complete.

Figure 3:
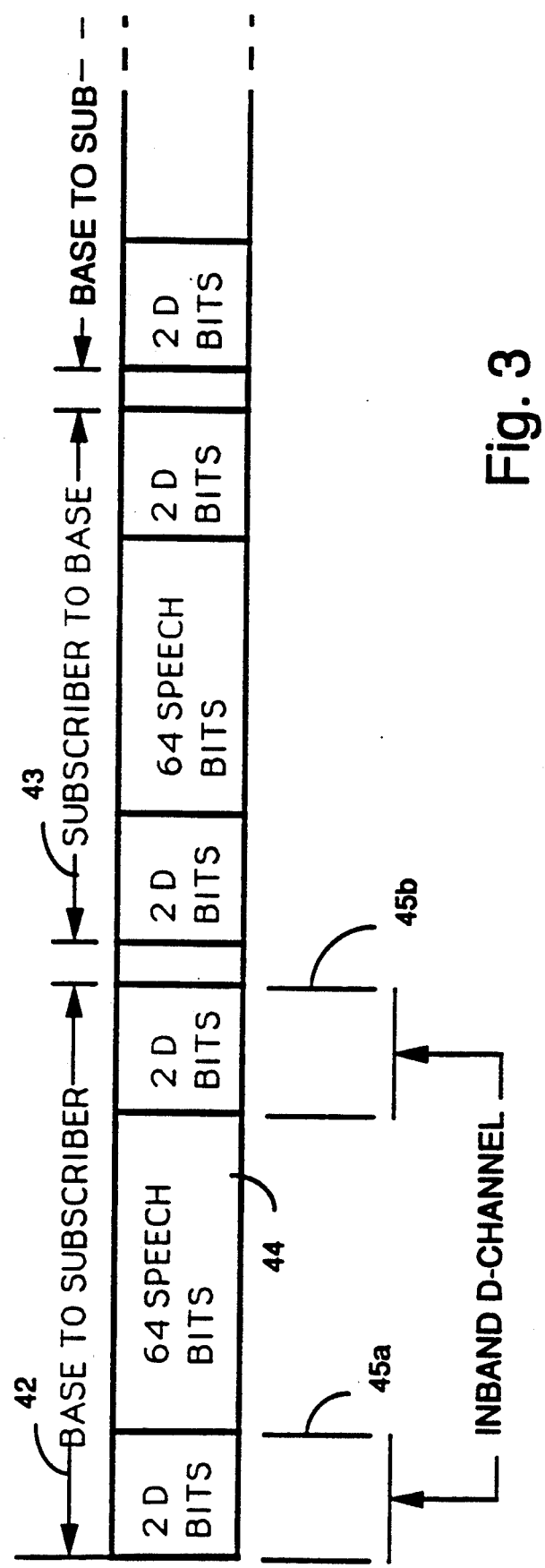
FIG. 3 illustrates the frame structure of a traffic channel.

The signalling and traffic channels of the wireless communication system may be used in time-division duplex mode. That is, base station and subscriber terminal alternately transmit so that their transmissions do not overlap. This technique is commonly referred to as "pingpong". This is shown in FIG. 3.

As is shown, the frame structure is comprised of one slot 42 used for communication between the base station and the subscriber terminal and another slot 43 for communication between the subscriber terminal and the base station. Each slot contains a voice or data portion 44 and an inband or associated signalling channel comprised of two sets of bits 45a and 45b. In the preferred embodiment, the voice or data portion contains 64 bits of information per frame and the inband or associated signalling channel contain four bits of information per frame.

What is claimed is:

1. A method of performing a radio channel hand-over in a radio system with dynamic channel allocation, from a serving base station in communication with a subscriber terminal to a target base station, comprising the steps of:

selecting, at said target base station, from a plurality of traffic channels, a group of candidate traffic channels, with low interference levels as measured at the target base station;

forwarding, from the target base station to the serving base station, a message indicative of the candidate traffic channels in said group;

sending the message from the serving base station to the subscriber terminal along a signalling channel linking the serving base station and the subscriber terminal;

receiving the message at the subscriber terminal;

scanning each candidate traffic channel in said group indicated by the message;

selecting, the candidate traffic channel from said group having a lowest interference level, as measured at the subscriber terminal;

forwarding, to the serving base station, a response message indicative of the selected candidate traffic channel;

sending the response message to the target base station; and switching to the selected candidate traffic channel at the subscriber terminal and the target base station.

2. A method as defined in claim 1, wherein said group of candidate traffic channels are selected at the target base station by:

scanning each traffic channel in said plurality of traffic channels;

detecting the interference level on the scanned traffic channels, and selecting the scanned traffic channel as the candidate traffic channel if the interference level is below a first predetermined threshold.

3. A method as defined in claim 2, wherein additional candidate traffic channels are selected from the plurality of traffic channels available for service if an inadequate number of the candidate traffic channels were found to have interference levels below the first predetermined threshold.

4. A method as defined in claim 5, wherein if additional candidate traffic channels are selected, a traffic channel of the additional candidate traffic channels having the lowest interference level above the first predetermined threshold will be selected.

5. A method as defined in claim 4, wherein if any remaining traffic channels in said plurality have an excessive level of interference offering inadequate communication between the target base station and the subscriber terminal, they will be excluded from the selection.

6. A method as defined in claim 2, wherein said message is sent to the serving base station by:

grouping as a list, each candidate traffic channel identified as having low interference levels at the target base station; and forwarding to the serving base station the list of the candidate traffic channels, along an inter base station connection link.

7. A method as defined in claim 6, wherein the candidate traffic channel on the list is determined to have low interference levels at the subscriber terminal by:

scanning each candidate traffic channel identified on the list;

detecting the interference level on each scanned candidate traffic channel; and selecting the candidate traffic channel with the lowest interference level.

* * * * *